United States Patent
Gush

(10) Patent No.: US 10,474,237 B2
(45) Date of Patent: Nov. 12, 2019

(54) HAPTIC FEEDBACK FOR ROTARY WING AIRCRAFT

(71) Applicant: Rolls-Royce Corporation, Indianapolis, IN (US)

(72) Inventor: Paul Gush, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 246 days.

(21) Appl. No.: 15/658,651

(22) Filed: Jul. 25, 2017

(65) Prior Publication Data

US 2019/0033969 A1 Jan. 31, 2019

(51) Int. Cl.
*G06F 3/01* (2006.01)
*B64C 13/04* (2006.01)
*G09B 9/46* (2006.01)

(52) U.S. Cl.
CPC .............. *G06F 3/016* (2013.01); *B64C 13/04* (2013.01); *G09B 9/46* (2013.01)

(58) Field of Classification Search
None
See application file for complete search history.

(56) References Cited

U.S. PATENT DOCUMENTS

| | | | |
|---|---|---|---|
| 2,566,409 A | 9/1951 | Greene | |
| 3,733,039 A | 5/1973 | O'Connor et al. | |
| 4,115,755 A * | 9/1978 | Cotton | G05D 1/0066 244/17.13 |
| 5,076,517 A * | 12/1991 | Ferranti | B64C 13/04 244/228 |
| 5,986,582 A | 11/1999 | Greene et al. | |
| 6,002,349 A * | 12/1999 | Greene | B64D 43/00 340/965 |
| 6,145,428 A * | 11/2000 | Gold | F41G 9/002 244/17.13 |
| 7,098,811 B2 * | 8/2006 | Augustin | B64C 13/46 340/965 |
| 7,126,496 B2 | 10/2006 | Greene | |
| 7,262,712 B2 | 8/2007 | Greene | |
| 10,139,493 B1 * | 11/2018 | Chamberlain | G01S 17/933 |

(Continued)

OTHER PUBLICATIONS

"Products: Tactile Cueing," Safe Flight Instrument Corporation, retrieved from https://www.safeflight.com/products/exceedance-warning-system, on May 11, 2017, 2 pp.

(Continued)

*Primary Examiner* — Shelley Chen
(74) *Attorney, Agent, or Firm* — Shumaker & Sieffert, P.A.

(57) ABSTRACT

A method for providing haptic feedback to a user of a rotary wing aircraft that includes receiving, by a computing device, a signal indicative of a user input selecting a control system state for a rotary wing aircraft, where, upon selection, the control system state modifies one or more operational parameters of the rotary wing aircraft, and in response to receiving the signal, outputting, by the computing device, a signal to a shaker system coupled to a collective stick, where the signal is configured to cause the shaker system to provide a haptic feedback via the collective stick, and where the haptic feedback includes a signature that indicates that the control system state has been activated.

20 Claims, 2 Drawing Sheets

(56) References Cited

U.S. PATENT DOCUMENTS

| | | | | |
|---|---|---|---|---|
| 2003/0094539 | A1* | 5/2003 | Schaeffer | B64C 13/10 244/17.13 |
| 2004/0010354 | A1* | 1/2004 | Nicholas | B64C 13/503 701/4 |
| 2005/0151672 | A1* | 7/2005 | Augustin | B64C 13/46 340/965 |
| 2006/0071817 | A1* | 4/2006 | Greene | B64C 13/10 340/965 |
| 2009/0266940 | A1* | 10/2009 | Miller | B64C 13/10 244/223 |
| 2013/0054053 | A1* | 2/2013 | Greenfield | B64D 31/04 701/3 |
| 2013/0221153 | A1* | 8/2013 | Worsham, II | B64C 27/006 244/17.13 |
| 2016/0304190 | A1* | 10/2016 | Grohmann | B64C 13/46 |
| 2018/0329430 | A1* | 11/2018 | Bothwell | B64C 27/04 |
| 2019/0016443 | A1* | 1/2019 | Alfred | B64C 13/503 |

OTHER PUBLICATIONS

Sahasrabudhe et al., "Simulation Investigation of a Comprehensive-Axis Tactile Cueing System", Journal of the American Helicopter Society, vol. 51, No. 3, Jul. 2006, pp. 215-224.

* cited by examiner

HAPTIC FEEDBACK FOR ROTARY WING AIRCRAFT

TECHNICAL FIELD

The present disclosure relates to pilot warning systems for rotary wing aircraft using haptic feedback.

BACKGROUND

Warning systems may be useful for capturing the attention of a pilot and relaying useful information to the pilot regarding the system conditions of a fixed wing or rotary wing aircraft. Such warning systems may include auditory, visual, or haptic alerts delivered to the pilot relating to various system conditions. In rotary wing aircraft, the duration between warning a pilot and the need to have the pilot respond may be relatively short, such as on the order of a few seconds. In such scenarios, conveyance of accurate, clear, and concise information relating to the system conditions of the rotary wing aircraft becomes important for the pilot to comprehend and initiate an appropriate response in the allotted time.

SUMMARY

In some examples, the disclosure describes a method including receiving, by a computing device, a signal indicative of a user input selecting a control system state for a rotary wing aircraft, where, upon selection, the control system state modifies one or more operational parameters of the rotary wing aircraft, and in response to receiving the signal, outputting, by the computing device, a signal to a shaker system coupled to a collective stick, where the signal is configured to cause the shaker system to provide a haptic feedback via the collective stick, and where the haptic feedback includes a signature that indicates that the control system state has been activated.

In some examples, the disclosure describes a system that includes a computing device, a collective stick configured to control a pitch of a rotary wing aircraft, a shaker system coupled to the collective stick, and a control state selector. The control state selector configured to output a signal to the computing device in response to activation of the control state selector, where an operational parameter of the rotary wing aircraft is modified in response to the activation of the control state selector. The computing device is configured to receive the signal from the control state selector and output a signal to the shaker system, in response to receiving the signal, where the signal causes the shaker system to provide a haptic feedback via the collective stick, and where the haptic feedback indicates that the control state selector has been activated.

In some examples, the disclosure describes a computer readable storage medium including instructions that, when executed, cause at least one processor to: receive a signal indicative of a user input selecting a control system state for the rotary wing aircraft, where the control system state modifies one or more operational parameters of the rotary wing aircraft upon activation; and in response to the activation of the control system state, output a signal to a shaker system coupled to a collective stick, where the signal is configured to cause the shaker system to provide a haptic feedback via the collective stick, and where the haptic feedback indicates that the control system state has been activated.

The details of one or more examples are set forth in the accompanying drawings and the description below. Other features, objects, and advantages will be apparent from the description and drawings, and from the claims.

DETAILED DESCRIPTION

Figure 1:
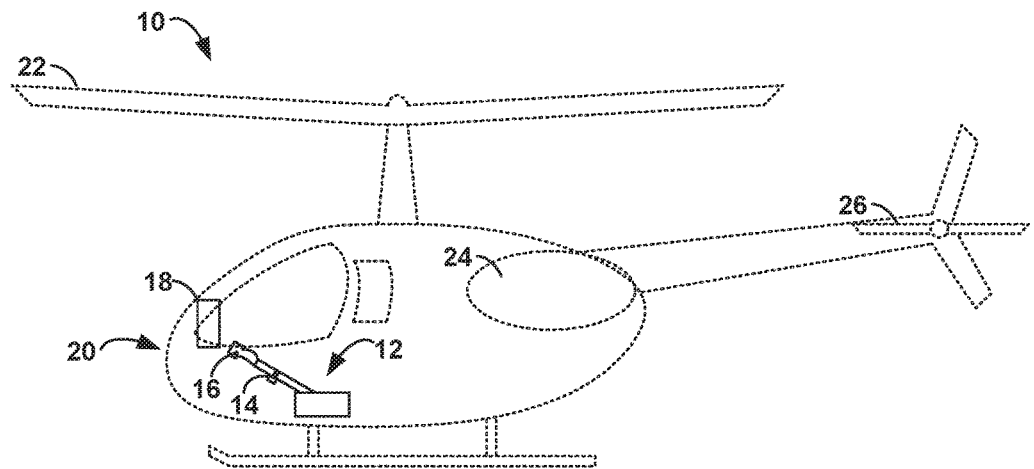
FIG. 1 is a schematic view of an example rotary wing aircraft that includes an example haptic feedback response system for providing haptic feedback to a pilot.

The present disclosure describes systems and techniques for providing haptic feedback via a collective stick or lever used to control the pitch (e.g., climb and descent) of a rotary wing aircraft to alert a pilot of the aircraft to a control system state of the aircraft being activated. As used herein, a "control system state" refers to a predetermined flight system condition that a user (e.g., pilot) may activate to cause the aircraft to enter into a pre-programed system condition that modifies one or more operational parameters of the rotary wing aircraft. Examples of control system states may include, but are not limited to, activation of a quiet mode setting, an event simulation mode, a training mode setting (e.g., a one-engine inoperative (OEI) training mode), or the like. While the disclosure primarily describes the use of the haptic feedback system with respect to a quiet mode engagement, such descriptions are not intended to limit the disclosure to a quiet mode engagement and the haptic feedback system may be equally applied to other control system states.

During flight of a rotary wing aircraft, it may be desirable for the user to enter into a control system state for training or operation purposes. For example, in certain situations it may be desirable for the pilot to reduce the overall noise associated with the operation of the aircraft. Reducing the noise generated by the rotary wing aircraft may be useful during certain procedures such as approach, cruise, hover, or the like. The noise reduction may also be desirable for certain types of applications such as for tourism or stealth operations of the rotary wing aircraft. Operating in such a reduced noise profile may be referred to as entering a "quiet mode" setting of the rotary wing aircraft.

In some examples, entering a control system state, such as a quiet mode setting, of the rotary wing aircraft may include an active modification of one or more of the operational parameters of the rotary wing aircraft. Such operational parameters may include modification of one or more of the rotational speed (e.g., RPM) of the main rotor, tail rotor, or engine(s); main rotor pitch; exhaust suppression; operational limits (e.g., torque limits) of one or more engine(s), or the like. For example, upon activation of a quiet mode setting, the rotational speed of the main rotor, tail rotor, and/or engine may be reduced (e.g., reduced by about 8% of normal operational parameters). The active modification refers to an affirmative change in one or more of the operational parameters of the rotary wing aircraft as opposed to a passive monitoring of the operational parameters or the changes that occur through normal flight operations/maneuvers.

In some examples, inadvertent activation of one or more of the control system states, e.g., the quiet mode setting, may appear similar to engine or system failure of the aircraft, prompting the pilot to take immediate action. By providing a haptic feedback response to the pilot upon activation of the control system state, the pilot may receive a prompt, conspicuous, and discernable alert that the control system state has been activated, thereby alerting the pilot as to the cause of the change in operational parameters of the rotary wing aircraft. In some examples, the early and discernable haptic feedback alert may prevent the pilot from performing an unnecessary emergency procedure.

In some examples, the haptic feedback response techniques described herein may include receiving, by a computing device, a signal indicative of a user input selecting a control system state such as a quiet mode setting for a rotary wing aircraft. The control system state may reduce the rotational speed (RPM) of at least one of a main rotor, a tail rotor, or an engine(s) of the rotary wing aircraft, reduce operating limits (e.g., torque limits) of an engine, or the like. Upon receiving the signal, the computing device may output a signal to a shaker system coupled to a collective stick in response to the activation of the control system state, where the signal is configured to cause the shaker system to provide a haptic feedback via the collective stick to indicate that the control system state has been activated.

FIG. 1 shows a schematic view of an example rotary wing aircraft 10 that includes an example haptic feedback response system 20. Haptic feedback response system 20 includes a computing device 18, a collective stick 12 configured to control the pitch angle of all main rotor blades of rotary wing aircraft 10 collectively, a shaker system 14 coupled to the collective stick 12, and a control state selector 16 configured to, upon activation, output a signal to computing device 18 to initiate a control system state such as a quiet mode setting. Such control system states may include actively reducing the rotational speed for the main rotor 22, the engine 24, and/or the tail rotor 26 of rotary wing aircraft 10 in order to reduce the noise profile of the aircraft, simulate an event scenario, enter into a training mode, or the like.

Computing device 18, as described further below with respect to FIG. 2, includes processing circuitry configured to receive the signal from control state selector 16 and output a signal to shaker system 14 in response to receiving the signal to cause shaker system 14 to provide a haptic feedback to the pilot via collective stick 12 indicating that the control system state has been activated.

As described above, in some examples during the flight of rotary wing aircraft 10, it may be desirable for the pilot to reduce the overall noise production associated with the operation of the aircraft. Such reduced noise profiles may be referred to as entering a "quiet mode" setting of rotary wing aircraft 10. While a quiet mode may be indicated by rotary wing aircraft 10 entering a reduced noise profile, the designation "quiet" does not imply that the noise profile of rotary wing aircraft 10 is reduced below human auditory perception levels. Instead, quiet mode is used to indicate that the overall loudness or decibel output of rotary wing aircraft 10 may be reduced for operational purposes by some extent.

In some examples, the pilot may initiate one or more control system states such as a pre-programed noise reduction profile by activating control state selector 16. The control state selector 16 may send a signal to computing device 18 to alter one or more of the operational parameters of rotary wing aircraft 10 to initiate the control system state such as a quiet mode setting. Such operational parameters that may be adjusted during the control system state may include at least one of reducing the rotational speed (e.g., RPM) of main rotor 22, reducing the RPM of engine 24, reducing the RPM of tail rotor 26, or reducing one or more operation limits of engine 24. For example, during normal flight operations, the RPM of main rotor 22, tail rotor 26, and engine 24 may be paired and synced to operate at or near 100% rated speed. Upon activation of a quiet mode setting via control state selector 16, computing device 18 may send a signal to cause the rotational speed of main rotor 22, engine 24, or tail rotor 26 to be reduced to some value that is less than 100% (e.g., about 92% of the normal operational value). The reduced rotational speed of main rotor 22, engine 24, and/or tail rotor 26 thereby reduces the noise profile of rotary wing aircraft 10.

While the location of control state selector 16 may be position at any useful location within the cockpit of rotary wing aircraft 10, in some examples, control state selector 16 may be conveniently located on collective stick 12 or on a control cluster where it can be easily accessed. In some examples, control state selector 16 may be configured as a toggle switch on collective stick 12, allowing the pilot to easily flip the toggle switch to activate the control system state such as one or more of pre-programed quiet mode operational settings.

During flight, a user may inadvertently activate one of the pre-programed control system state via control state selector 16. For example, control state selector 16 may include an unguarded toggle switch located proximate to other switches, which may be relatively easily, inadvertently actuated. In such examples, computing device 18 may modify one or more of the operational parameters of rotary wing aircraft 10, such as reducing the rotational speed of main rotor 22, engine 24, and/or tail rotor 26, or reduce operational limits of engine 24 to initiate the control system state. However, due to the inadvertent selection of the control system state (e.g., quiet mode setting), the sudden reduction in the rotational speed of main rotor 22, engine 24, and/or tail rotor 26, or operational limits of engine 24 may appear to the pilot as an engine or equipment failure of rotary wing aircraft 10.

During an actual event of engine or primary equipment failure of rotary wing aircraft 10, a pilot may immediately initiate an emergency autorotation landing procedure. The autorotation landing procedure involves lowering the collective stick 12 to reduce the torque required by the main rotor 22 and tail rotor 26. Through a series of maneuvers, the pilot quickly descends rotary wing aircraft 10 to utilize air flow to preserve the rotational speed of main rotor 22. In a final maneuver, the pilot pitches rotary wing aircraft 10 up to convert the preserved rotational energy into a lift force that allows rotary wing aircraft 10 to land. Depending on where rotary wing aircraft 10 is being operated at the time of the suspected engine or primary equipment failure (e.g., over water or high canopy cover), the initiation of the emergency autorotation landing procedure may lead to damage of rotary wing aircraft 10.

The duration between the pilot suspecting an engine or equipment failure and initiating an emergency autorotation landing procedure may be relatively short, e.g., less than a few seconds, as the pilot must react quickly in order to preserve the rotational speed of main rotor 22. In some examples, the quick response needed to preserve flight capabilities of rotary wing aircraft 10 upon suspecting engine or equipment failure may prevent the pilot from performing a full system analysis and reviewing all available information to confirm that engine failure has occurred before initiating the emergency autorotation landing procedure. Thus, in some instances in which control state selector 16 has been inadvertently activated, the pilot may suspect engine or equipment failure is occurring based on the reduction in the rotational speed of main rotor 22, engine 24, and/or tail rotor 26 and initiate an emergency autorotation landing procedure to preserve the flight capabilities of rotary wing aircraft 10, even though engine or equipment failure has not actually occurred.

In some examples, rotary wing aircraft 10 may include a tactical display. Computing device 18 may cause the tactical display to present a visual indication, such as an icon, indicating that control state selector 16 has been activated. For example, in conjunction with initiating the quiet mode setting, computing device 18 may cause the tactical display to display a low main rotor speed (Nr) indication or icon. Additionally or alternatively, computing device 18 may cause a speaker to output an auditory cue indicating the initiation of the control system state. However, due to the relatively short response time between the pilot suspecting engine or equipment failure and initiating an emergency autorotation landing procedure, the pilot may overlook the visual indication and/or auditory cue before initiating the emergency landing procedure. This problem may be heighted during sensitive flight operations, such as where the attention of the pilot must be focused outside the cockpit or where rotary wing aircraft 10 is being operated near the ground (e.g., less than 2000 ft. above the ground), due to the reduced response time available to the pilot before he or she must initiate a response procedure.

Haptic feedback response system 20 may provide a substantially immediate, discernable, and effective alert to the pilot that computing device 18 has activated a control system state. For example, upon receipt of a signal from control state selector 16 that a control system state has been initiated, computing device 18 may output a signal to shaker system 14 coupled to the collective stick 12 to initiate a haptic feedback response via collective stick 12. The haptic feedback may include vibrating collective stick 12. In general, a hand of the pilot will be positioned on collective stick 12 during flight operations, particularly during demanding flight operations. As such, vibrating collective stick 12 provides a discernable and effective method of alerting the pilot that computing device 18 has engaged the control system state, thereby significantly reducing the chance of the pilot initiating an unnecessary emergency autorotation landing procedure of rotary wing aircraft 10.

Shaker system 14 may include any suitable haptic output device for providing haptic feedback to the pilot via collective stick 12. In some examples, shaker system 14 may include an unbalanced motor, a reciprocating motor, or the like to produce a discernable vibration of collective stick 12. Example motorized assemblies that may function as shaker system 14 and attached to collective stick 12 may include, for example, the Tactile Cueing devices available from Safe Flight Instrument Corporation of White Plains, N.Y.

In some examples, computing device 18 may be configured to transmit an output signal to shaker system 14 that induces a haptic output having a predetermined pattern or characteristic. The predetermined pattern or characteristic may enable the pilot to associate the haptic feedback with activation of a control system state, and may distinguish the haptic feedback indicating activation of the control system state from other haptic feedback or shaking of collective stick 12 during normal operation of rotary wing aircraft 10. In some examples, the haptic output may include a relatively high amplitude, relatively low frequency, haptic feedback response readily discernable from the ambient vibrations of rotary wing aircraft 10. Additionally or alternatively, the haptic feedback response indicative of activation of the control system state may include a patterned (e.g., pulsed) vibration. The pulsed vibration may include periods of vibration separated by periods of no vibration.

Computing device 18 may be configured to receive and transmit electrical signals to or from control state selector 16 and shaker system 14. Computing device 18 may include any suitable arrangement of hardware, software, firmware, or any combination thereof, to perform the techniques attributed to computing device 18 described herein. In some examples, computing device 18 may include, for example, an onboard computer or tactical display of rotary wing aircraft 10.

Figure 2:
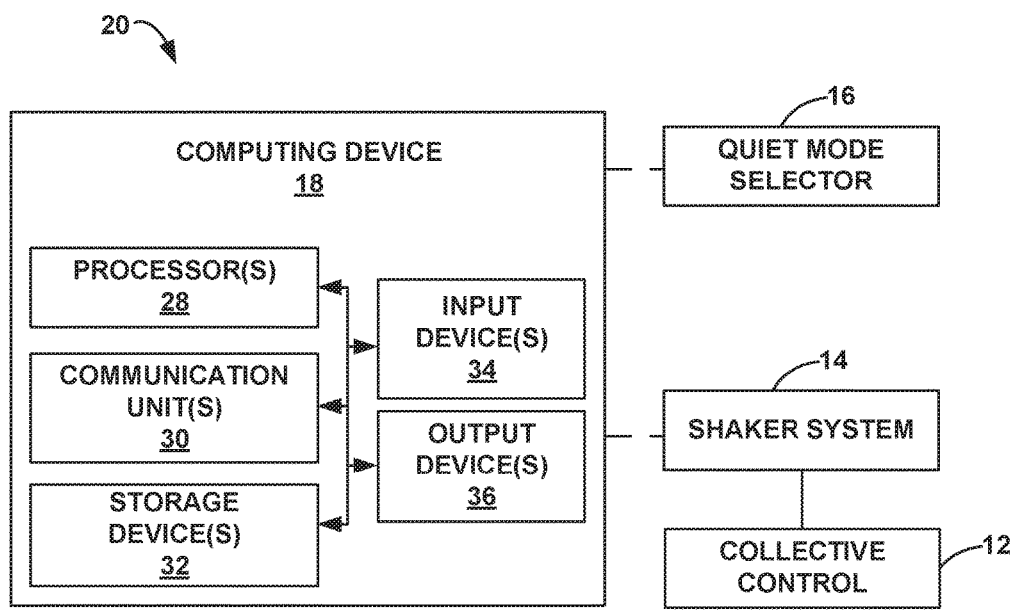
FIG. 2 is a schematic block diagram of the example haptic feedback response system and computing device incorporated in the rotary wing aircraft of FIG. 1.

FIG. 2 is a conceptual and schematic block diagram illustrating haptic feedback response system 20 and an example computing device 18. As shown in FIG. 2, computing device 18 may include one or more processors 28, one or more communication units 30, one or more storage devices 32, one or more input devices 34, and one or more output devices 36. Although computing device 18 is generally described as being a single unit configured to receive and transmit electrical signals to one or more components of rotary wing aircraft 10 in response to the activation of a control system state (e.g., quiet mode setting) of the aircraft, in some examples, the individual components of system 20 may include a plurality of devices each configured to perform some or all of the operations described herein. Such hardware, software, and firmware of computing device 18 may be implemented within the same device or within separate devices to support the various techniques described in this disclosure. In addition, any of the described units or components may be implemented together or separately as discrete but interoperable logic devices. Depiction of different features as units or devices is intended to highlight different functional aspects and does not necessarily imply that such units must be realized by separate hardware, firmware, or software components. Rather, functionality associated with one or more units or devices may be performed by separate hardware, firmware, or software components, or integrated within common or separate hardware, firmware, or software components.

Computing device 18 includes one or more processors 28 that may be configured to implement functionality and/or process instructions for execution within computing device 18. For example, processors 28 may be capable of or configured to process input signals from control state selector 16 and instructions stored by storage device 32. Examples of one or more processors 28 may include, any one or more microprocessors, digital signal processors (DSPs), application specific integrated circuits (ASICs), field programmable gate arrays (FPGAs), or any other equivalent integrated or discrete logic circuitry, as well as any combinations of such components. Processors 28 may include one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Computing device 18 further includes one or more communication units 30. Computing device 18 may utilize communication units 30 to communicate with external devices (e.g., other components of haptic feedback response system 20 or other components of rotary wing aircraft 10) via one or more networks, such as one or more wired or wireless networks. Communication unit 30 may include a network interface card, an optical transceiver, a radio frequency transceiver, a serial or parallel port, or any other type of device that can send and receive information through one or more processors 28.

Computer device 18 includes one or more storage devices 32, which may be configured to store information within computing device 18 during operation. Storage devices 32, in some examples, include a computer-readable storage medium or computer-readable storage device. In some examples, storage devices 32 include a temporary memory, meaning that a primary purpose of storage device 32 is not long-term storage. Storage devices 32, in some examples, include a volatile memory, meaning that storage device 32 does not maintain stored contents when power is not provided to storage device 32. Examples of volatile memories include random access memories (RAM), dynamic random access memories (DRAM), static random access memories (SRAM), and other forms of volatile memories known in the art. In some examples, storage devices 32 are used to store program instructions for execution by processors 28. Storage devices 32, in some examples, are used by software or applications executed by computing device 18 to temporarily store information during program execution.

In some examples, storage devices 32 may further include one or more devices configured for longer-term storage of information. In some examples, storage devices 32 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

In some examples, the techniques performed by computing device 18 described in this disclosure may also be embodied or encoded in an article of manufacture including a computer-readable storage media encoded with instructions. Instructions embedded or encoded in an article of manufacture including a computer-readable storage medium, may cause one or more of processors 28 to implement one or more of the techniques described herein. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media contain executable instructions to perform techniques substantially similar to those described below with respect to FIGS. 3 and 4.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Computing device 18 also includes one or more input devices 34 and one or more output devices 36. Input devices 34 may be configured to receive input from a user (e.g., pilot) through tactile, audio, or video sources. Examples of input devices may include, but are not limited to, a cyclic control, collective stick 12, anti-torque pedals, control state selector 16, touch displays, toggle selectors, or the like. Output devices 36 may be configured to provide output to a user using auditory, tactile, or visual media in response to input(s) received from one or more of input devices 34. Example, output devices may include, but are not limited to, shaker system 14, a tactical display, a speaker, or any other type of device for converting a signal into an appropriate form understandable to the user or other machines.

Computing device 18 may include additional components that, for clarity, are not shown in FIG. 2. For example, computing device 18 may include a power supply to provide power to the components of computing device 18. Similarly, the components of computing device 18 shown in FIG. 2 may not be necessary in every example of computing device 18.

Figure 3:
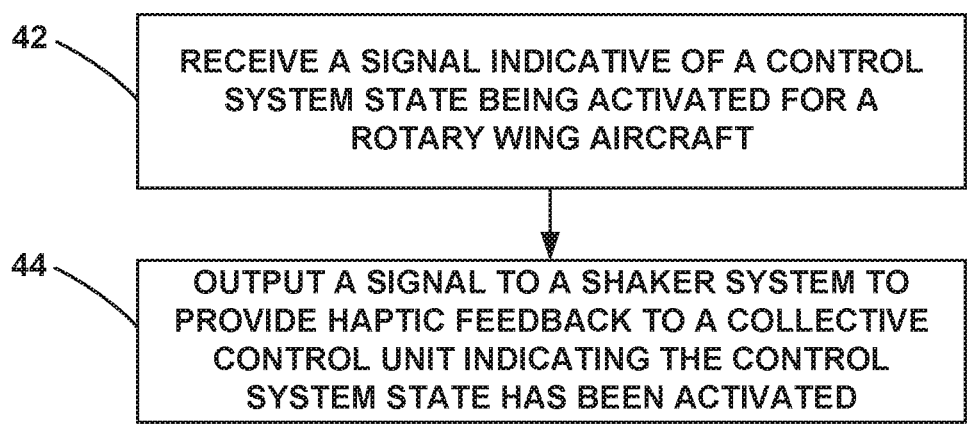
FIG. 3 is a flow diagram illustrating an example technique for providing haptic feedback to a pilot in response to activating a control system state of a rotary wing aircraft.

FIG. 3 is a flow diagram illustrating an example technique for providing haptic feedback to a pilot in response to activation of a control system state of rotary wing aircraft 10. The technique of FIG. 3 is described with respect to haptic feedback response system 20 of FIGS. 1 and 2 for the activation of a quiet mode setting; however, the technique of FIG. 3 may be implemented with other haptic feedback systems or other control system states, or system 20 of FIGS. 1 and 2 may be used with techniques other than those described with respect to FIG. 3.

The technique of FIG. 3 includes receiving, by computing device 18, a signal indicative of a user input selecting a control system state such as a quiet mode setting for a rotary wing aircraft 10 (42). The technique of FIG. 3 also includes outputting, by computing device 18, a signal to shaker system 14 coupled to collective stick 12 in response to the activation of the control system state (44). The signal is configured to cause shaker system 14 to provide a haptic feedback response to a pilot via the collective stick 12. The haptic feedback indicates that computing device 18 has activated the control system state, e.g., the quiet mode setting of rotary wing aircraft 10.

As described above, the user, e.g., the pilot, may cause control state selector 16 to output the signal to computing device 18 by toggling control state selector 16 to select a control system state. The control system state may include a pre-programed system condition to reduce the noise profile or enter a training mode scenario of rotary wing aircraft 10 by actively modifying one or more of the operational parameters of rotary wing aircraft 10. Such operational parameters modified by selecting the quiet mode setting may include, for example, a reduction in one or more of the rotational speed (e.g., RPM) of main rotor 22, engine 24, tail rotor 26, or the like. Reducing the rotational speed of such components may reduce the decibel level produced by rotary wing aircraft 18.

In response to activating the control system state in response to actuation of control state selector 16, computing device 18 sends a signal to shaker system 14 to initiate a haptic feedback response (e.g., vibration). Shaker system 14 may be mechanically coupled to collective stick 12, thereby transmitting the haptic feedback response through collective stick 12 to provide the user with a substantially immediate, discernable indication that the control system state of rotary wing aircraft 10 has been initiated.

In some examples, the haptic feedback provided by shaker system 14 may alert the pilot and prevent the pilot from preforming an unnecessary maneuver of rotary wing aircraft 10. For example, during normal operation of rotary wing aircraft 10, the activation of a control system state (e.g., reduction in the rotational speed of main rotor 22, engine 24, or tail rotor 26) may resemble an engine or equipment failure. In some examples, where the control system state has been inadvertently activated, the appearance of rotary wing aircraft 10 undergoing engine or equipment failure may prompt the pilot to immediacy initiate an emergency autorotation landing procedure. The haptic feedback provided by shaker system 14 may quickly and conspicuously alert the pilot that a quiet mode setting of rotary wing aircraft 10 has been activated, thereby alerting the pilot as to the cause for the sudden reduction in the rotational speed of main rotor 22, engine 24, and/or tail rotor 26, or other operational parameter of rotary wing aircraft 10. Such early and discernable feedback to the pilot may reduce the chance that the pilot initiates an unnecessary maneuver, such as an emergency autorotation.

The haptic feedback provided by shaker system 14 to the user via collective stick 12 may include any suitable form of tactile cueing. In some examples, shaker system 14 may include an unbalanced motor, a reciprocating motor, or similar mechanism that induces a discernable vibration that travels through collective stick 12 to the hand of a user placed on collective stick 12. In some examples, the haptic output may include a relatively high amplitude, relatively low frequency, haptic feedback response readily discernable over the ambient vibrations of rotary wing aircraft 10. Additionally or alternatively, the haptic feedback response indicative of activation of the control system state may include a patterned (e.g., pulsed) vibration. The pulsed vibration may include periods of vibration separated by periods of no vibration readily discernable by the pilot.

In some examples, the haptic feedback response may be paired with additional alerts such as a display icon of tactical display of rotary wing aircraft 10 or an auditory cue via a speaker or headset.

In some examples, the overall duration of the haptic feedback provided by shaker system 14 indicating that the control system state has been activated may be relatively short, lasting for a predetermined duration only a few seconds, e.g., between about 5 seconds to about 60 seconds. Additionally or alternatively, the haptic feedback response (e.g., vibration) may last for at least as long as the time it takes for rotary wing aircraft 10 to adjust and reach the pre-programed operational parameters associated with the control system state. For example, when the control system state includes a quiet mode setting, the duration of the haptic feedback response may last for at least as long as it takes for the rotational speed of main rotor 22 or engine 24 to reduce to a pre-programed value associated with the quiet mode setting (e.g., about 92% or normal operational parameters), which may be about 5-10 seconds. In other examples, the haptic feedback may last for as long as the control system state is activated.

In some examples, computing device 18 may be configured to output signals to shaker system 14 or another haptic feedback device to output haptic feedback signals indicative of other information or events. Examples of additional haptic feedback may include, but are not limited to, tactile cueing associated with whether rotary wing aircraft 10 is approaching certain flight operational limits of the aircraft. For example, one or more haptic feedback systems (e.g., shaker system 14) may be installed to provide the pilot with feedback that rotary wing aircraft 10 has reached or exceeded the transmission torque, a low rotor speed threshold (e.g., reaching the stall limits of the aircraft), or exhaust gas temperature operational limits of the engine. Additionally or alternatively, the haptic feedback systems may provide the pilot with information rotary wing aircraft 10 is approaching flight limitations of the aircraft and may stall unless corrective action by the pilot is performed. In some examples, the additional haptic feedback systems may provide the pilot of an early warning of a potential engine or system failure. In contrast to the control system states, such additional haptic feedback responses may involve passive monitoring of one or more of the operational parameters of rotary wing aircraft 10 to determine whether certain flight conditions have been reached or exceeded as opposed to the active modification of one or more of the operational parameters induced by the control system state activation.

In some examples in which shaker system 14 output haptic feedback responses indicative of multiple different events or multiple types of information, the respective haptic feedback response associated with each respective event of type of information may be unique. This may allow the pilot to discern between the type of event or information being communicated based only on the haptic feedback response. For example, shaker system 14 may output a patterned or pulsed haptic feedback signal to indicate activation of a control system state. The patterned or pulsed haptic feedback signal may include a predetermined pattern, e.g., of pulse duration or width, pulse duty cycle (on time divided by on time plus off time), vibration intensity, vibration frequency, or the like. Computing device 18 may cause shaker system 14 to output a different haptic feedback signal with a different predetermined pattern to indicate that the limits of the aircraft have been met or exceeded. For example, the different predetermined pattern may include continuous vibration or a different pulsed pattern. In some examples, such haptic feedback associated with passive monitoring of the flight conditions may continue or intensify until the pilot returns the aircraft 10 to within normal operational parameters or takes appropriate corrective action.

The patterned haptic feedback may have similar vibration parameters to those described above with respect to FIGS. 1 and 2. The vibration may be pulsed in any suitable pattern that allows the user to discern the patterned vibration from that of a continuous vibration. For example, the patterned vibration may be pulsed in repeating half second intervals or clustered as repeating patterns of pulsed vibrations.

Various examples have been described. These and other examples are within the scope of the following claims.

What is claimed is:

1. A method comprising:
receiving, by a computing device, a signal indicative of a user input selecting a control system state for a rotary wing aircraft, wherein upon selection, the control system state modifies one or more operational parameters of the rotary wing aircraft; and
in response to receiving the signal, outputting, by the computing device, a signal to a shaker system coupled to a collective stick, wherein the signal is configured to cause the shaker system to provide a haptic feedback via the collective stick, and wherein the haptic feedback comprises a signature that indicates that the control system state has been activated.

2. The method of claim 1, wherein the haptic feedback comprises a pulsed vibration.

3. The method of claim 1, wherein the haptic feedback comprises a predetermined duration of time.

4. The method of claim 3, wherein the predetermined duration of time is longer than a time it takes for rotary wing aircraft to adjust and reach a pre-programed operational parameter associated with the activation of the control system state.

5. The method of claim 1, wherein the signal comprises a first signal, the method further comprising outputting, by the computing device, a second signal to the shaker system configured to cause the shaker system to provide a second haptic feedback via the collective stick in response to the computing device detecting the rotary wing aircraft reaching or exceeding flight operational limits, the second haptic feedback being distinguishable from the first haptic feedback.

6. The method of claim 5, wherein the first haptic feedback comprises a pulsed vibration and the second haptic feedback comprises a continuous vibration.

7. The method of claim 1, wherein the control system state comprises a predetermined flight system condition comprising at least one of a quiet mode setting, an event simulation mode, or a training mode setting.

8. The method of claim 1, wherein the control system state modifies the one or more operational parameters of the rotary wing aircraft by at least one of reducing a rotational speed (RPM) of a main rotor, a tail rotor, or an engine of the rotary wing aircraft, or changing an operational limit of the engine.

9. The method of claim 1, further comprising initiating, by the computing device, an auditory cue that the control system state has been activated.

10. A system comprising:
a computing device;
a collective stick configured to control a pitch of a rotary wing aircraft;
a shaker system coupled to the collective stick; and
a control state selector configured to output a signal to the computing device in response to activation of the control state selector, wherein an operational parameter of the rotary wing aircraft is modified in response to the activation of the control state selector, wherein the computing device is configured to receive the signal from the control state selector and output a signal to the shaker system, in response to receiving the signal, wherein the signal causes the shaker system to provide a haptic feedback via the collective stick, and wherein the haptic feedback indicates that the control state selector has been activated.

11. The system of claim 10, wherein the haptic feedback comprises a pulsed vibration.

12. The system of claim 10, wherein the haptic feedback comprises a predetermined duration of time that is longer than a time it takes for rotary wing aircraft to adjust and reach a pre-programmed operational parameter associated with the activation of the control state selector.

13. The system of claim 10, wherein the shaker system comprises an unbalanced motor or a reciprocating motor.

14. The system of claim 10, wherein the output signal to the shaker system comprises a first signal, wherein the computing device is further configured to output a second signal to the shaker system, the second signal causes the shaker system to provide a second haptic feedback via the collective stick in response to the computing device detecting the rotary wing aircraft reaching or exceeding flight operational limits, and wherein the second haptic feedback is distinguishable from the first haptic feedback.

15. The system of claim 14, wherein the first haptic feedback comprises a pulsed vibration and the second haptic feedback comprises a continuous vibration.

16. The system of claim 10, wherein the control state selector activates a predetermined flight system condition comprising at least one of a quiet mode setting, an event simulation mode, or a training mode setting.

17. The method of claim 10, wherein the operational parameter modified in response to the activation of the control state selector comprises at least one of a rotational speed (RPM) of a main rotor, a tail rotor, or an engine of the rotary wing aircraft, or an operational limit of the engine.

18. A computer readable storage medium comprising instructions that, when executed, cause at least one processor to:
receive a signal indicative of a user input selecting a control system state for the rotary wing aircraft, wherein the control system state modifies one or more operational parameters of the rotary wing aircraft upon activation; and
in response to the activation of the control system state, output a signal to a shaker system coupled to a collective stick, wherein the signal is configured to cause the shaker system to provide a haptic feedback via the collective stick, and wherein the haptic feedback indicates that the control system state has been activated.

19. The computer readable storage medium of claim 18, wherein the haptic feedback comprises a pulsed vibration.

20. The computer readable storage medium of claim 18, wherein the signal comprises a first signal, the computer readable storage medium further comprising instructions that, when executed, cause the at least one processor to output a second signal to the shaker system coupled to the collective stick configured to cause the shaker system to provide a second haptic feedback via the collective stick in response to the computing device detecting the rotary wing aircraft reaching or exceeding flight operational limits, the second haptic feedback being distinguishable from the first haptic feedback.

* * * * *